United States Patent [19]

Huebner et al.

[11] Patent Number: 5,477,240

[45] Date of Patent: Dec. 19, 1995

[54] CHARACTER SCROLLING METHOD AND APPARATUS

[75] Inventors: Samuel J. Huebner, Newhall, Calif.; James D. Greenfield, New York, N.Y.

[73] Assignee: Q-Co Industries, Inc., New York, N.Y.

[21] Appl. No.: 864,386

[22] Filed: Apr. 7, 1992

Related U.S. Application Data

[63] Continuation of Ser. No. 508,112, Apr. 11, 1990, abandoned.

[51] Int. Cl.$^6$ ...................................................... G09B 1/06
[52] U.S. Cl. ........................... 345/124; 345/123; 345/136; 345/199; 345/114
[58] Field of Search ...................................... 340/726, 724, 340/728; 345/124, 138, 136, 153, 147, 114, 123, 199; 395/135

[56] References Cited

U.S. PATENT DOCUMENTS

| | | | |
|---|---|---|---|
| 3,714,630 | 1/1973 | Cribbs | 382/37 |
| 4,654,650 | 3/1987 | Fadem | 340/726 |
| 4,704,605 | 11/1987 | Edelson | 340/703 |
| 4,714,919 | 12/1987 | Foster | 340/726 |
| 4,808,984 | 2/1989 | Trueblood et al. | 340/723 |
| 4,849,746 | 7/1989 | Dubner | 340/726 |

Primary Examiner—Richard Hjerpe
Assistant Examiner—Amare Mengistu
Attorney, Agent, or Firm—Robin, Blecker, Daley & Driscoll

[57] ABSTRACT

A method for scrolling, at a desired rate and in a given direction, a graphic character on a display having a predetermined number of actual scan lines and a vertical blanking interval occurring between successive display of all the actual horizontal scan lines of the display, involves the creation of fractional scan lines between successive vertical blanking intervals, the identification of leading and trailing edges of the character and the selective changing of the color or shading of pixels of the leading and trailing edges to effect scolling of the character.

4 Claims, 8 Drawing Sheets

CHARACTER SCROLLING METHOD AND APPARATUS

This is a continuation application under 37 CFR 1.62 of prior application Ser. No. 508,112, filed Apr. 11, 1990 now abandoned.

FIELD OF THE INVENTION

This invention relates generally to teleprompting displays and pertains more particularly to teleprompting methods and apparatus for smoothly scrolling characters across a video display.

BACKGROUND OF THE INVENTION

In various applications in the graphic display field, a requirement exists to move characters about a video screen. A foremost aspect of such graphic display is that the movement of the characters appear smooth. Particularly demanding applications are found in the fields of media and public speaking, wherein teleprompters vertically scroll text to prompt the reader. As perceived by a listener, the reading must be natural, as if the speaker is talking without the aid of a teleprompter. It is generally known in the art that smoothly scrolling text improves readability of moving text, decreases eye fatigue and, generally makes the speech appear more natural. Of significance also are such considerations as independence of the speaker's memory capacity and control of the time of presentation, the latter being fully controlled by the teleprompter apparatus based on control of the speed of movement of text across the display screen.

In teleprompters in use today, the smoothness of the vertical movement is a function of the number of vertical scan lines. The addition of more scan lines decreases the size of each vertical step taken by the display character, thereby smoothing the movement. However, standard video displays in use today in television have fixed formats comprised of a fixed numbers of scan lines. Additionally, the cost of the video display increases as the number of scan lines are increased.

One practice in prior art is to simulate additional scan lines (fractional scan lines) at the leading edge of the character by creating an illusion that fractional scan lines exist. Such illusion is accomplished by alternately displaying two adjacent scan lines, one scan line being the leading edge of the character, the other being the background immediately in front of the character. The human eye averages the two scan lines together thereby creating the illusion of an fractional scan line. When this method is employed, due to the decreased display frequency of each scan line, the two adjacent scan lines appear to flicker. Taking this method one step further, multiple fractional scan lines can be created by varying the periodicity in which two adjacent scan lines are displayed. However, since the rate of display of one of the scan lines is further decreased, the amount of flickering increases.

Another observation that is noted as background to the subject invention is that teleprompting systems heretofore known and effecting smooth scrolling involve particularly designed and dedicated computer hardware and are computationally intensive. The art has not heretofore seen implementation of teleprompting with smooth scrolling by generally usable computational equipment, such as the conventional personal computer.

SUMMARY OF THE INVENTION

The present invention has as its primary object the provision of teleprompting methods and apparatus which exhibit enhanced smoothness in the course of character scrolling.

A further object of the invention is the realization of teleprompter scrolling with general purpose computer hardware and in manner which is not computationally intense.

In attaining the foregoing and other objects and features, the invention provides an enhanced software-implementable practice of effecting fractional scan lines and providing shading or color variation intelligence to each pixel of a display. By the term "fractional scan line" is meant an artificial scan line occurring between adjacent actual scan lines pre-existing in a video display device. By the term "pixel" is meant a picture element created by the incidence of an electron beam on the light-emitting component of a video display device.

In the practice of the invention, for effecting scrolling on a color video display, a plurality of colors are employed and fractional scan lines are created in a corresponding plurality. Each character to be displayed is pre-analyzed for "leading edges" and "trailing edges", as below defined in detail, and pixels corresponding thereto are identified.

A personal computer (PC) implementable program defines as data therein color or shading saturation constants applicable to leading edge and trailing edge pixels correspondingly with the fractional scan lines. Color or shade palletes are selectively called into action correspondingly with progress of the program through its steps in painting the fractional scan lines of the video display device.

Methodology in accordance with the invention thus comprises steps for smoothly scrolling, at a desired rate and in a given direction, e.g., upwardly or downwardly, a graphic character on a display having a predetermined number of actual scan lines and a vertical blanking interval occurring between successive display of all the actual horizontal scan lines of the display, the method involving the use of fractional scan lines created to exist between successive of the vertical blanking intervals, the method including the steps of:

(a) displaying the character as a foreground character on the display;

(b) displaying a background for the character, the background being sensibly diverse from the foreground;

(c) identifying leading edges of the character, the leading edges being identified as marginal portions of the background that are adjacently abutted, in a direction directly opposite to the given direction of movement of the character, by the character;

(d) identifying trailing edges of the character, the trailing edges being identified as the marginal portions of the character that are adjacently abutted, in the direction directly opposite to the given direction of movement of the character, by the background;

(e) identifying a preselected number of the fractional scan lines as a function of the desired rate of character scrolling and the vertical blanking interval;

(f) providing a plurality of preselected saturation constants correspondingly with the preselected number of fractional scan lines;

(g) selecting a given number of the preselected number of fractional scan lines for the character scrolling; and (h) using the saturation constants selectively in accordance with the selected given number of the fractional scan lines to change the shading of leading edges and the trailing edges and thereby effecting the character scrolling.

The saturation constants are color saturation constants in the case of a color display and are shading constants in the case of a black and white display. Apparatus in accordance with the invention implements the foregoing steps.

Other objects and features of the invention will be further understood from the following detailed description of preferred embodiments and practices and from the drawings, wherein like reference numerals identify like parts and components throughout.

DESCRIPTION OF THE DRAWINGS

FIGS. 1 A–C are graphic diagrams explanatory of a prior art practice of scrolling a character vertically across a screen.

FIGS. 3 A–E are graphic representations of a character moving vertically across a screen in accordance with the invention.

DETAILED DESCRIPTION OF PREFERRED EMBODIMENTS AND PRACTICES

Figure 1A:
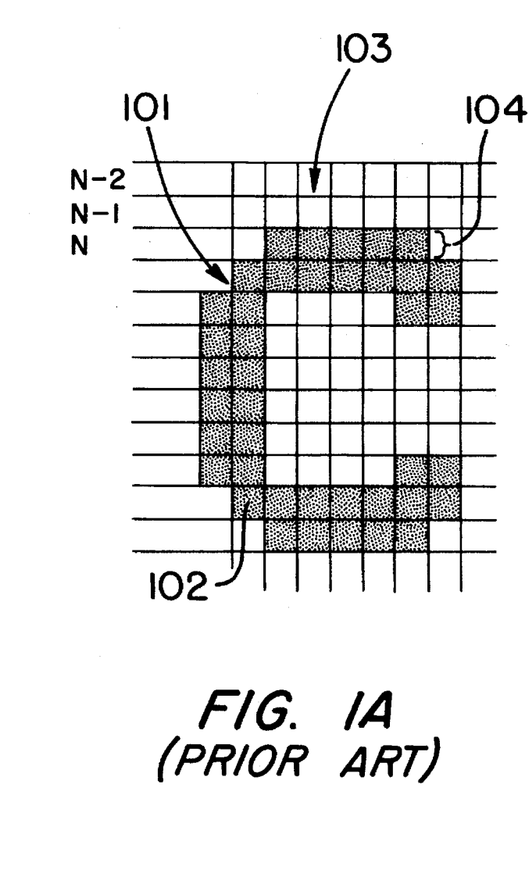
Figure 1B:
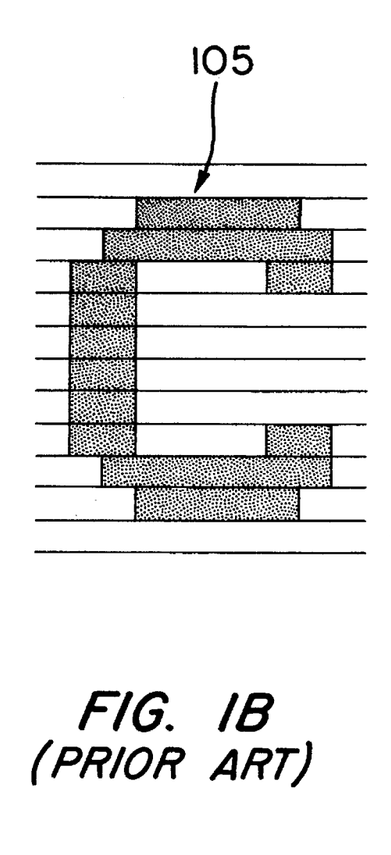
Figure 1C:
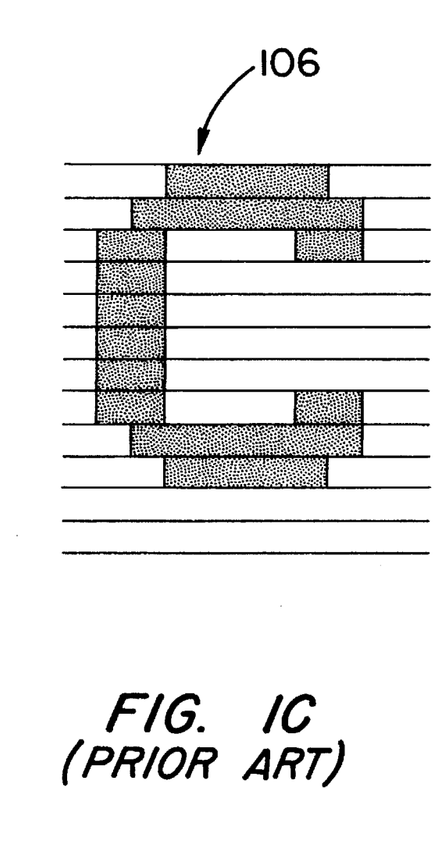

Prior to discussion of embodiments and practices in accordance with the invention, an example of conventional character scrolling will be discussed by reference to FIGS. 1A–1C. The character 101 as displayed is a composite of discrete pixels 102. The total number of pixels in the vertical direction on a given display is hardware limited to the number of scan lines. The time period for updating all the scan lines is the vertical blanking time (hereinafter called "V-blank"). V-blank is fixed by the available hardware. Assume the character to move at a rate of one scan line every three V-blank intervals. FIG. 1A shows the position 103 of character 101 at three successive V-blank intervals. The top edge 104 of the character is comprised of pixels of scan line N. FIG. 1B shows the character for the next three-successive V-blank intervals at position 105. Top edge 104 has moved up one scan line to scan line N–1. Similarly, FIG. 1C shows the character at the next three successive V-blank intervals at position 106. Top edge 104 has moved up one more scan line to scan line N–2. This process repeats until the character scrolls off the display. The scrolling motion of the character, as shown in FIGS. 1A–1C, is not smooth. The discrete step taken every third V-blank interval creates a discernible jitter.

Figure 2A:
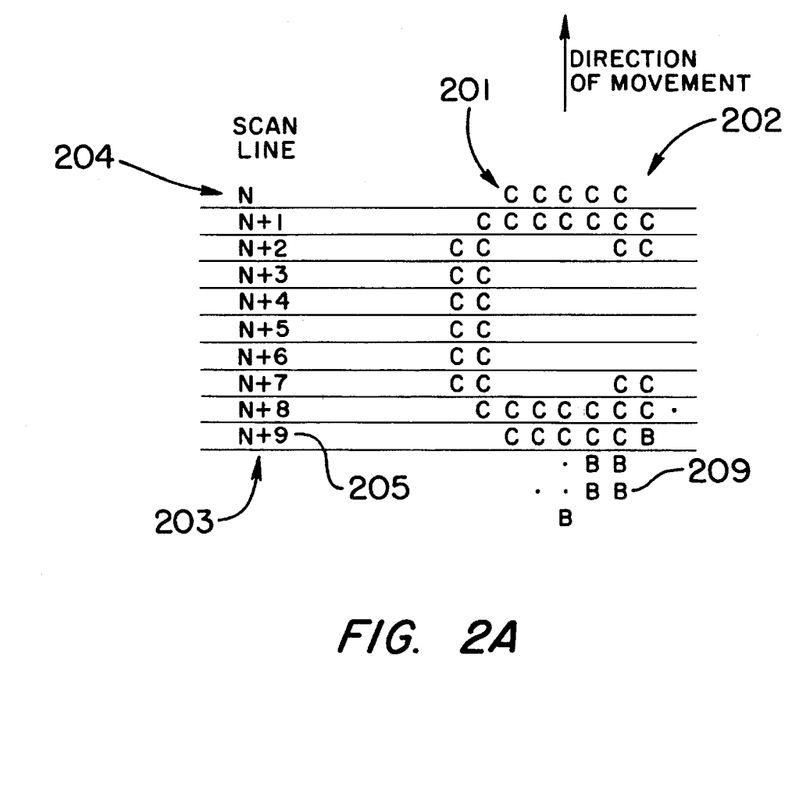
FIGS. 2A and 2B are graphic diagrams of a character with its leading and trailing edges identified in accordance with the invention.

Turning now to the subject invention, and referring to FIG. 2A, the foreground character 202 is a composite of individual pixels 201, the character extending from vertical scan line N to vertical scan line N+9. Each pixel contains either a foreground color or a background color.

Figure 2B:
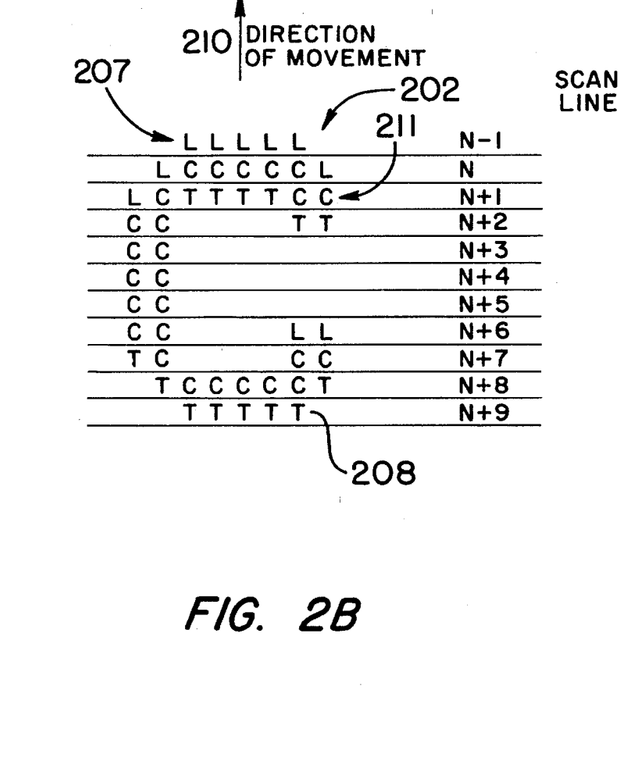

Processing is provided such that, all leading edges are identified, leading edges being defined as the marginal portion of the background that is adjacently abutted, in the direction directly opposite to the movement of the foreground character, by the foreground character. All trailing edges are also identified, the trailing edge being defined as the marginal portion of the foreground character that is adjacently abutted, in the direction directly opposite to the direction of movement of the foreground character, by the background. FIGS. 2B shows the foreground character 202 after the leading edge pixels L and trailing edge pixels T have been identified. Foreground character pixels that are neither leading nor trailing edges remain as foreground pixels C. Exemplary background pixels are noted as B. All leading edge pixels are assigned to a first color palette. Similarly, all trailing edge pixels are assigned to a second color palette.

FIGS. 3A–3E show a foreground character 301 moving vertically across a screen at V-blank intervals. To generate fractional scan lines, the colors of the first and second color palettes are set, thereby, affecting the color of the leading and trailing edge pixels. The selection of the color is a function of the character's velocity, the number of scan lines, and the V-blank time interval. For this embodiment, assume two hundred vertical scan lines and a V-blank time of ⅟60 second. Provided a character is to scroll vertically up the screen in 10 seconds, the character will increment one scan line every ³⁄60 seconds. Expressed alternatively, the character will move up one scan line every three V-blank intervals. In accordance with the invention, fractional scan lines are simulated during every V-blank interval.

Figures 3A, 3B:
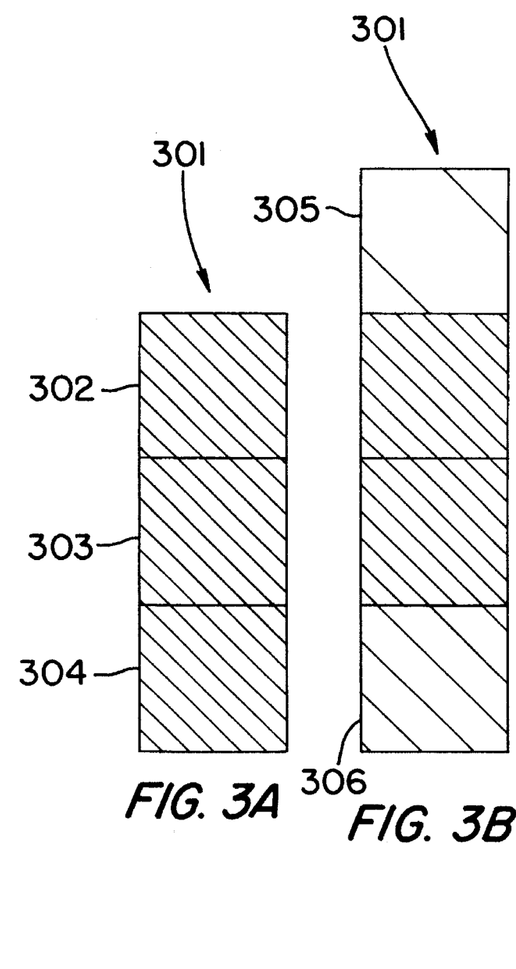
Figures 3C, 3D:
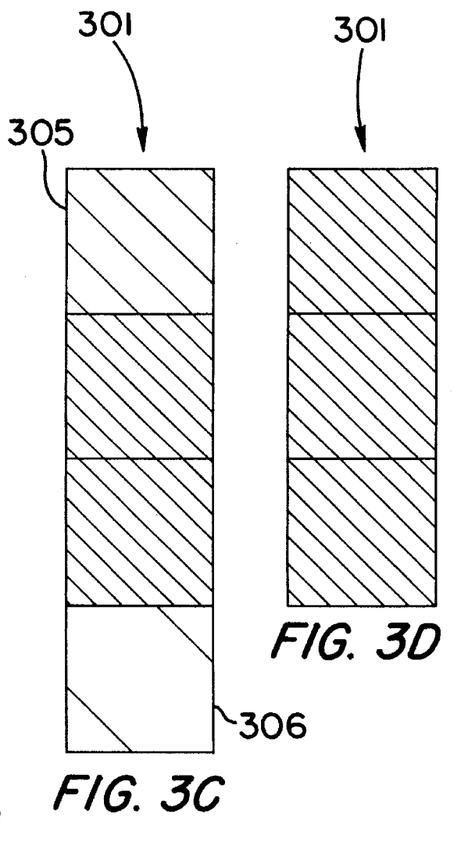
Figure 3E:
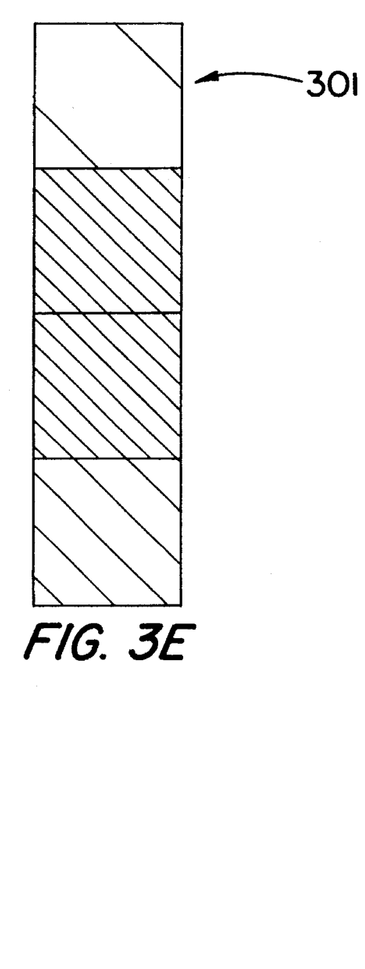

Character 301 comprises three pixels 302, 303 and 304. FIG. 3B shows the character after a first V-blank interval. The leading edge pixel 305 and trailing edge pixel 306 are identified and assigned to color palettes. The leading edge color palette is set so that the color of leading edge pixel 305 is a combination of approximately one-third foreground color and two-thirds background color. The trailing edge color palette is set so that the color of trailing edge pixel 306 is two-thirds foreground and one-third background. FIG. 3C shows the character after the second V-blank interval. The color of the leading edge pixel 305 is two-thirds foreground and one-third background. The color of the trailing edge pixel 306 is one-third foreground and two-thirds background. FIG. 3D shows the character 301 after the third V-blank interval. The leading edge pixel is now the same color as the foreground, and, the trailing edge pixel is the same color as the background. The process then repeats, FIG. 3E being the same as FIG. 3B except that character 301 is shifted up one scan line.

Figure 4:
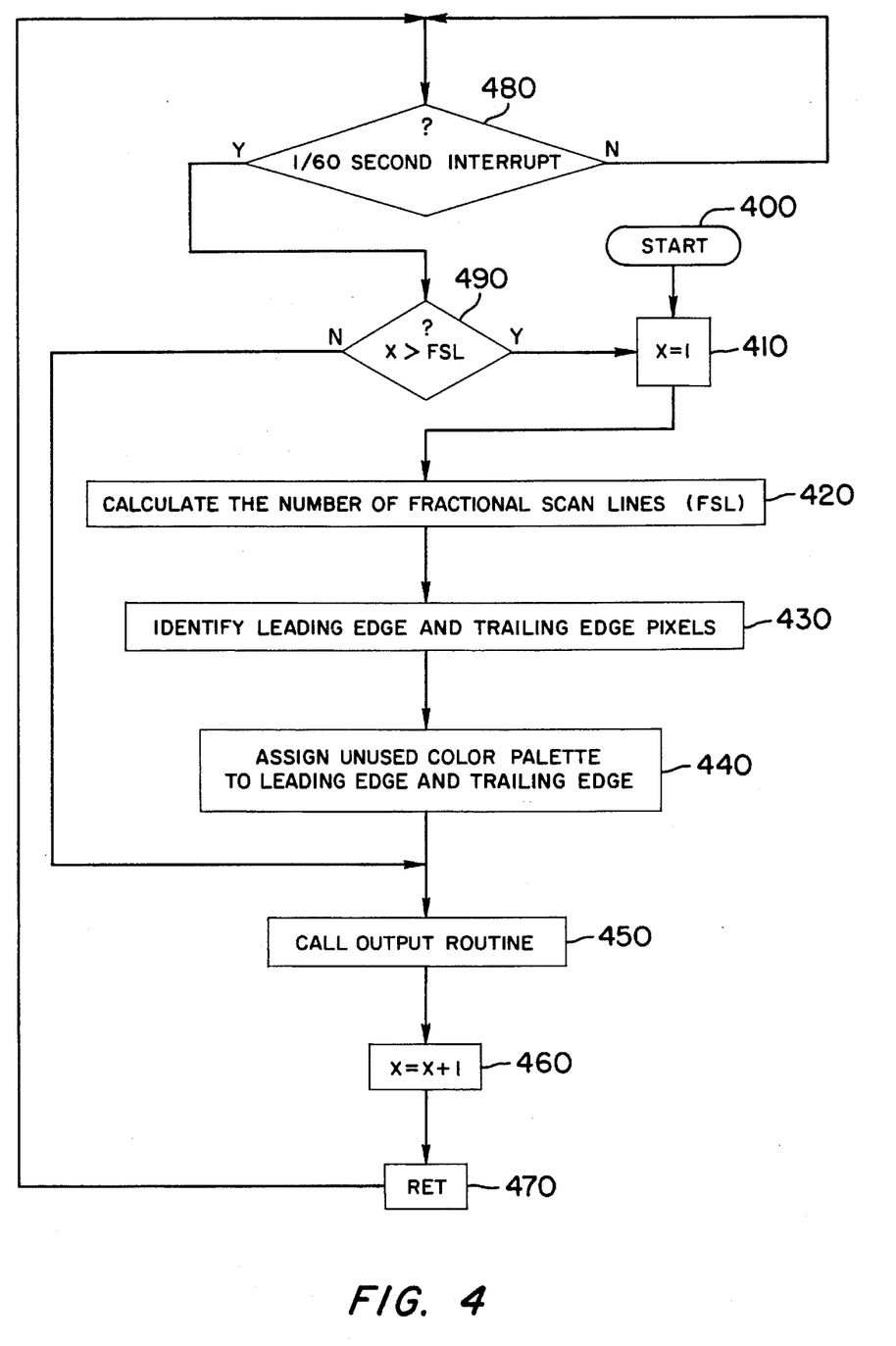
FIG. 4 is a flow chart per the invention for moving a character across a screen.

Referring to FIG. 4, the flow chart thereof is indicative of the operations for moving a character about a screen and is entered in step 400—START—.

Progress is from step 400 to step 410—X=1—. X is a loop counter indicative of the fractional scan line currently being processed. In step 420,—CALCULATE THE NUMBER OF FRACTIONAL SCAN LINES (FSL)—, the number of fractional scan lines is calculated as a function of the total number of scan lines, the V-blank rate, and the velocity of the character. This step is described in further detail in connection with FIG. 5.

In step 430,—IDENTIFY LEADING EDGE AND TRAILING EDGE PIXELS—, the leading and trailing pixels of the character are identified as a function of the direction of motion of the character. This step, with respect to the leading edge pixels, is described in further detail in connection with FIG. 6.

Step 440,—ASSIGN UNUSED COLOR PALETTE TO LEADING EDGE AND TRAILING EDGE—, assigns all the leading edge pixels to an unused first color palette and the trailing edge pixels to an unused second color palette.

In step 450,—CALL OUTPUT ROUTINE—, the colors of the first and second color palettes are determined as a function of the fractional scan line being processed, the foreground color, and the background color. This step is discussed in further detail in connection with FIG. 7.

In step 460—X=X+1—, the fractional line counter is incremented. In step 470—RET—, a return is effected, progress being to step 480.

In step 480,—? 1/60 SECOND INTERRUPT—, the operation of this routine is suspended until the next V-blank interrupt at which time progress is made to step 490.

In step 490,—? X>FSL—, test is made as to whether all fractional scan lines have been processed. If no (N), progress is to step 450. If yes (Y), the character has moved one full scan line and progress is to step 410.

Figure 5:
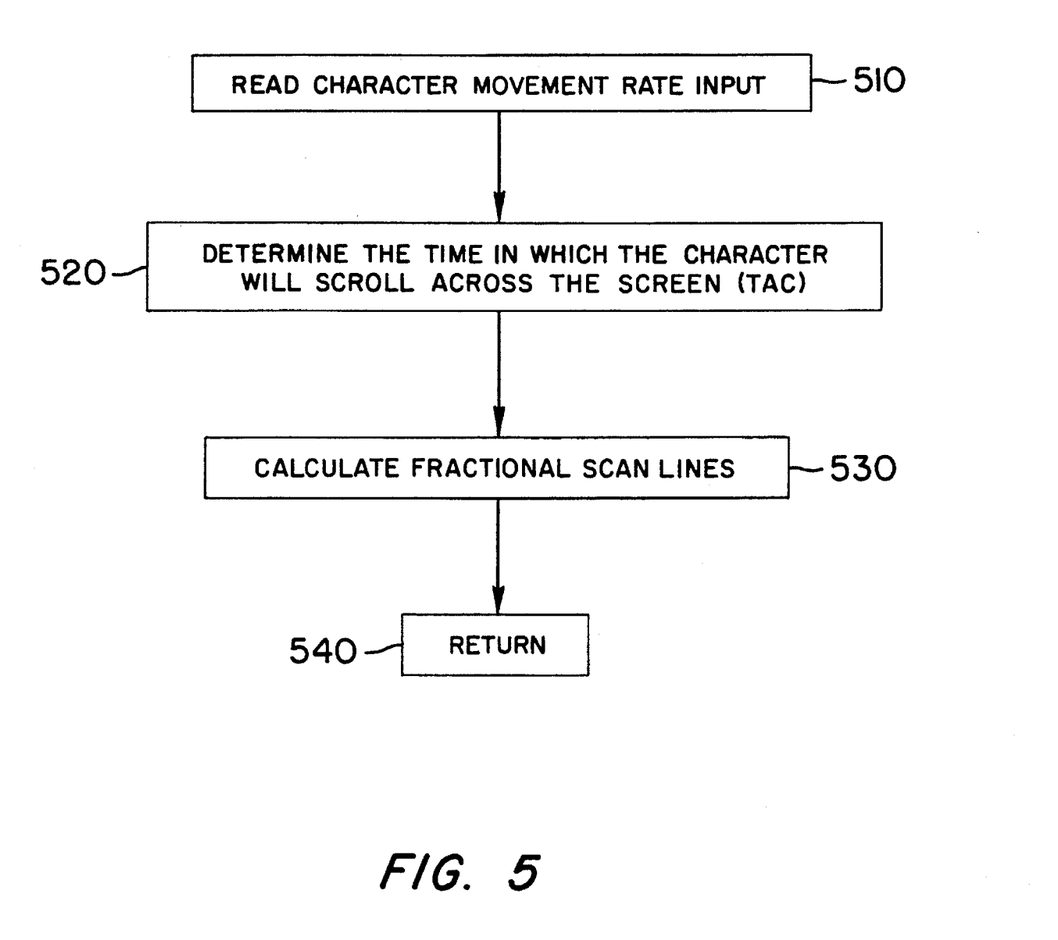
FIG. 5 is a flow chart per the invention for determining the required number of fractional scan lines.

FIG. 5 is a flow chart indicative of the operations for calculating the number of fractional scan lines (FSL) and is an expansion of step 420 of FIG. 4.

In step 510,—READ CHARACTER MOVEMENT RATE INPUT—, a reading is made of a potentiometer or like variable and readable device, set by a user to indicate the desired rate of movement of the character.

In step 520,—DETERMINE THE TIME IN WHICH THE CHARACTER WILL SCROLL ACROSS THE SCREEN (TAC)—, converting circuitry translates the resistance of the potentiometer to a time in which the character will scroll across the screen (TAC).

In step 530,—CALCULATE FRACTIONAL SCAN LINES—, the number of fractional scan lines is determined by the following formula:

FSL=(TAC/# vertical scan lines per screen)(V-Blank), where TAC is the time for the character to scroll across the screen and V-Blank is the vertical blanking interval.
Step 540—RETURN—provides exit from the subroutine.

Figure 6:
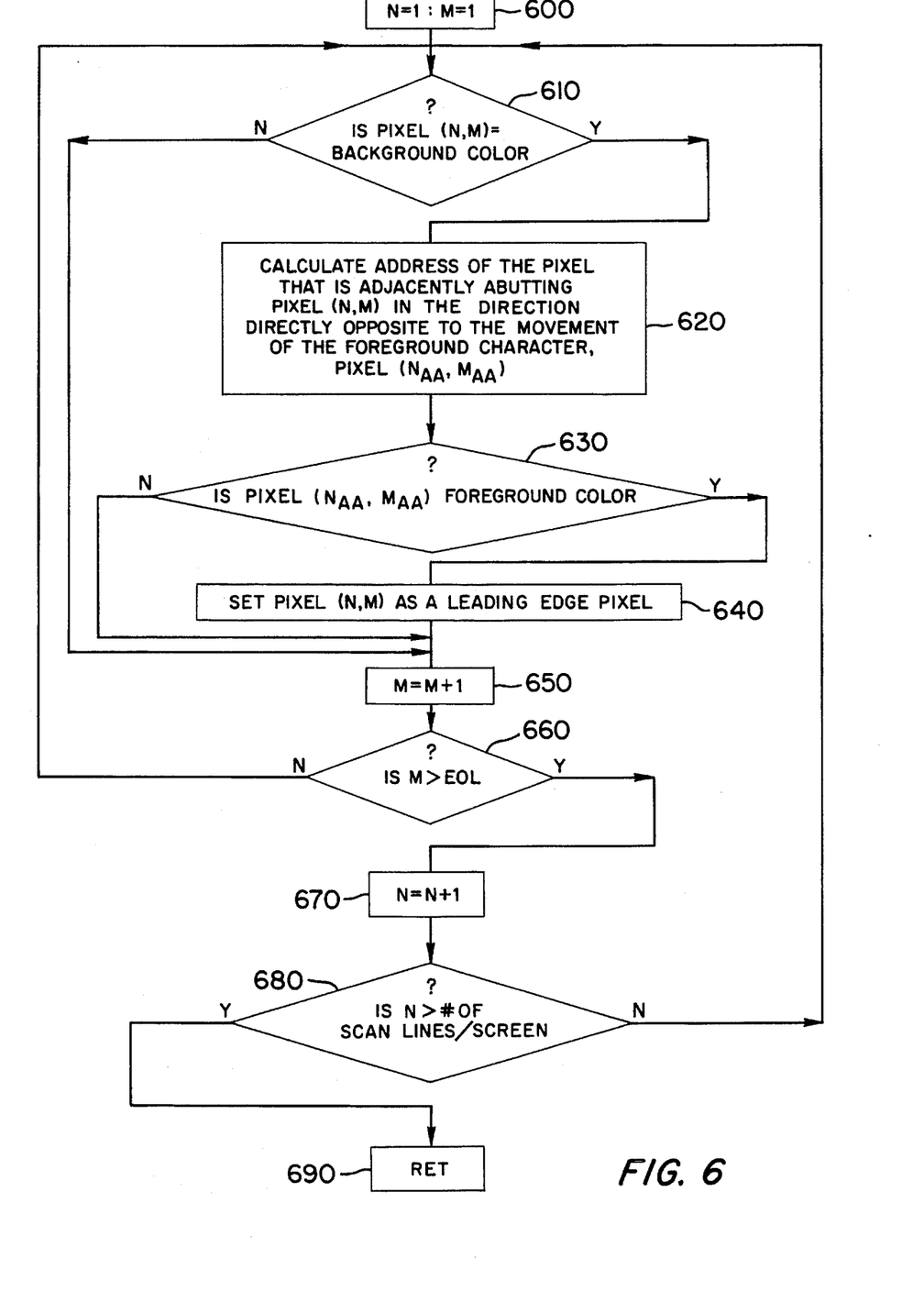
FIG. 6 is a flow chart per the invention for identifying the leading edge pixels.

FIG. 6 is an expansion of step 430 in FIG. 4. In step 600, —N=1: M=1—, N and M are nested loop counters, N indicating the scan line of a given pixel, and M indicating the horizontal pixel location of a given pixel.

Steps 650, 660, 670 and 680, discussed below, provide a nested loop that does not provide an exit until M horizontal pixels in N vertical scan lines are tested in steps 610–640.

In step 610,—? IS PIXEL (N,M)=BACKGROUND COLOR—, each pixel on the screen is tested to determine if the current pixel color is the same as the background color. If negative, pixel (N,M) cannot be a leading edge pixel and progress is to step 650. If affirmative, pixel (N,M) might be a leading edge pixel and progress is to step 620 for further testing.

In step 620, —CALCULATE ADDRESS OF THE PIXEL THAT IS ADJACENTLY ABUTTING PIXEL (N,M) IN THE DIRECTION DIRECTLY OPPOSITE TO THE MOVEMENT OF THE FOREGROUND CHARACTER, PIXEL $(N_{AA}, M_{AA})$—, the address is obtained for the adjacent pixel to be tested.

In step 630,—? IS PIXEL $(N_{AA}, M_{AA})$ FOREGROUND COLOR—, if the pixel $(N_{AA}, M_{AA})$ located in step 620 is not of foreground color, then pixel (N, M) cannot be a leading edge pixel and progress is to step 650. If pixel $(N_{AA}, M_{AA})$ is of foreground color, then pixel (N, M) is a leading edge pixel.

In step 640, —SET PIXEL (N, M) AS A LEADING EDGE PIXEL—, the pixel (N, M) under test is set as a leading edge pixel.

Step 650, —M=M+1—, increments M and step 660, —? IS M >EOL—, inquiry is made as to whether M is beyond the end of the limit of M. If the response to the inquiry is negative, progress is to step 610. If the response is in the affirmative, progress is to step 670, —N=N+1—, wherein N is incremented.

In step 680, —? IS N># OF SCAN LINES/SCREEN, the FIG. 6 subroutine inquires into whether N is beyond its limit. If the response to the inquiry is negative, progress is to stem 610. If affirmative, step 690, —RET—, calls for a return.

As will be evident from the foregoing routine of FIG. 6, trailing edge pixels are identifiable by converse operations, per the difference in definition of leading edge and trailing edge pixels above set forth.

Figure 7:
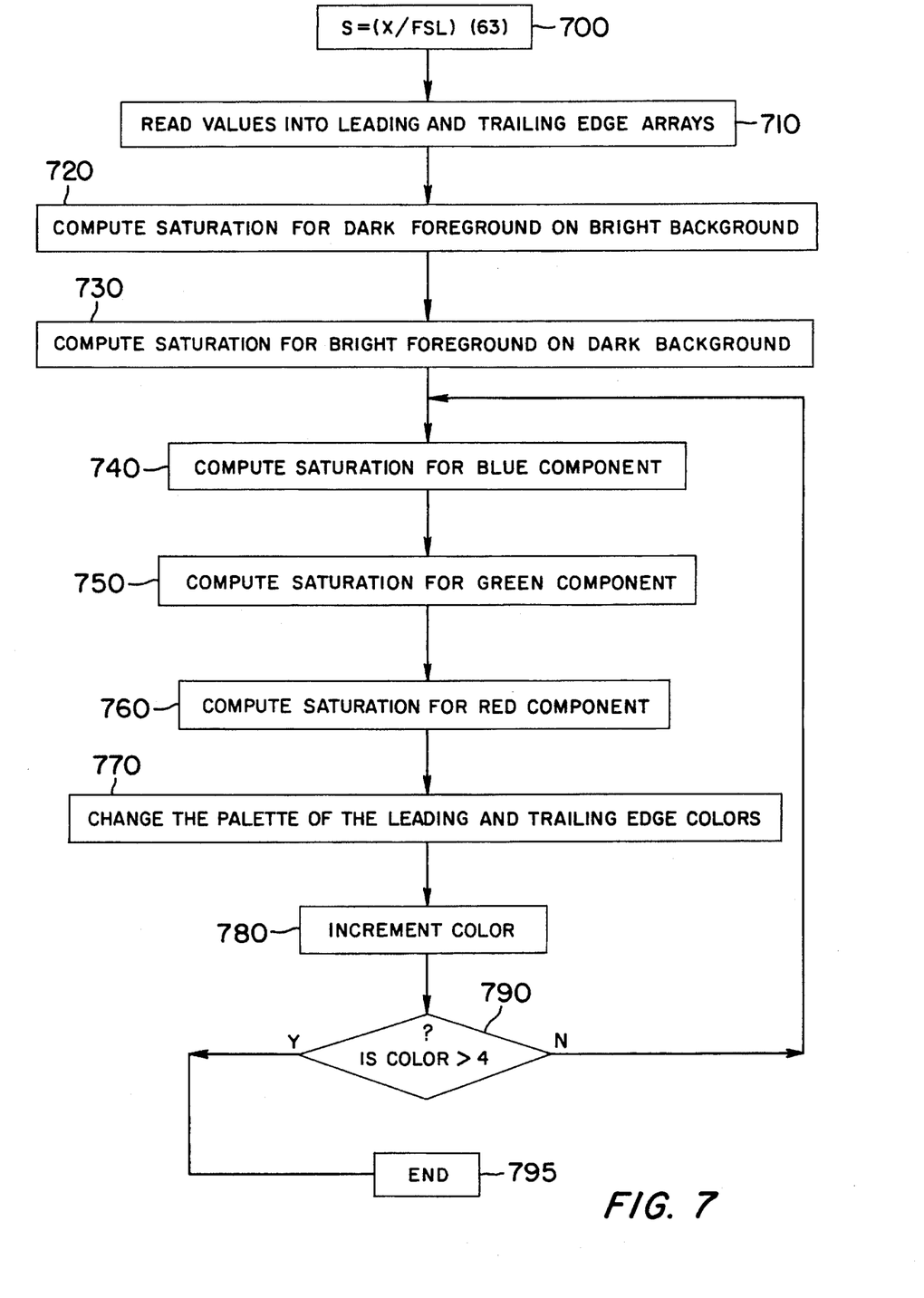
FIG. 7 is a flow chart per the invention for changing the color of the leading and trailing edge pixels.

FIG. 7 is a flow chart indicative of the operations for selecting leading and trailing edge color palettes.

In step 700, —S =(X/FSL)(63)—, X is the fractional scan line currently being processed and FSL is the total number of fractional scan lines. X and FSL may be, for example, zero to sixty-three and X is less than or equal to FSL, therefore S is equal to zero to sixty-three.

In step 710, —READ VALUES INTO LEADING AND TRAILING EDGE ARRAYS—, two data tables, each comprising sixty-four entries are read into memory.

In step 720, —COMPUTE SATURATION FOR DARK FOREGROUND 0N BRIGHT BACKGROUND—, S is used to index into the data tables read in step 710 to obtain the saturation value for dark foreground on bright background.

In step 730, —COMPUTE SATURATION FOR BRIGHT FOREGROUND 0N DARK BACKGROUND—, S is used to index into the data tables read in step 710 to obtain the saturation value for bright foreground on dark background.

In step 740, —COMPUTE SATURATION FOR BLUE COMPONENT—, depending upon whether the blue component of the foreground is light or dark with respect to the blue component of the background, the saturation value obtained in either step 720 or 730 is used to compute the saturation value of the blue component for both the leading and trailing edges.

In step 750, —COMPUTE SATURATION FOR GREEN COMPONENT—, depending upon whether the green component of the foreground is light or dark with respect to the green component of the background, the saturation value obtained in either step 720 or 730 is used to compute the saturation value of the green component for both the leading and trailing edges.

In step 760, —COMPUTE SATURATION FOR RED COMPONENT—, depending upon whether the red component of the foreground is light or dark with respect to the red component of the background, the saturation value obtained in either step 720 or 730 is used to compute the saturation value of the red component for both the leading and trailing edges.

In step 770, —CHANGE THE PALETTE OF THE LEADING AND TRAILING EDGE COLORS—, the blue, green and red saturation values obtained in steps 740–760 are used as new values for the first and second unused color palettes.

In the course of entering step 740, the color number is initialized at one. In step 780, —INCREMENT COLOR—, the color number is incremented. In step 790, —IS COLOR>4, —, inquiry is made as to whether the color number is greater than four. If so, progress is to step 795, —END—. If negative, progress is to step 740.

Figure 8:
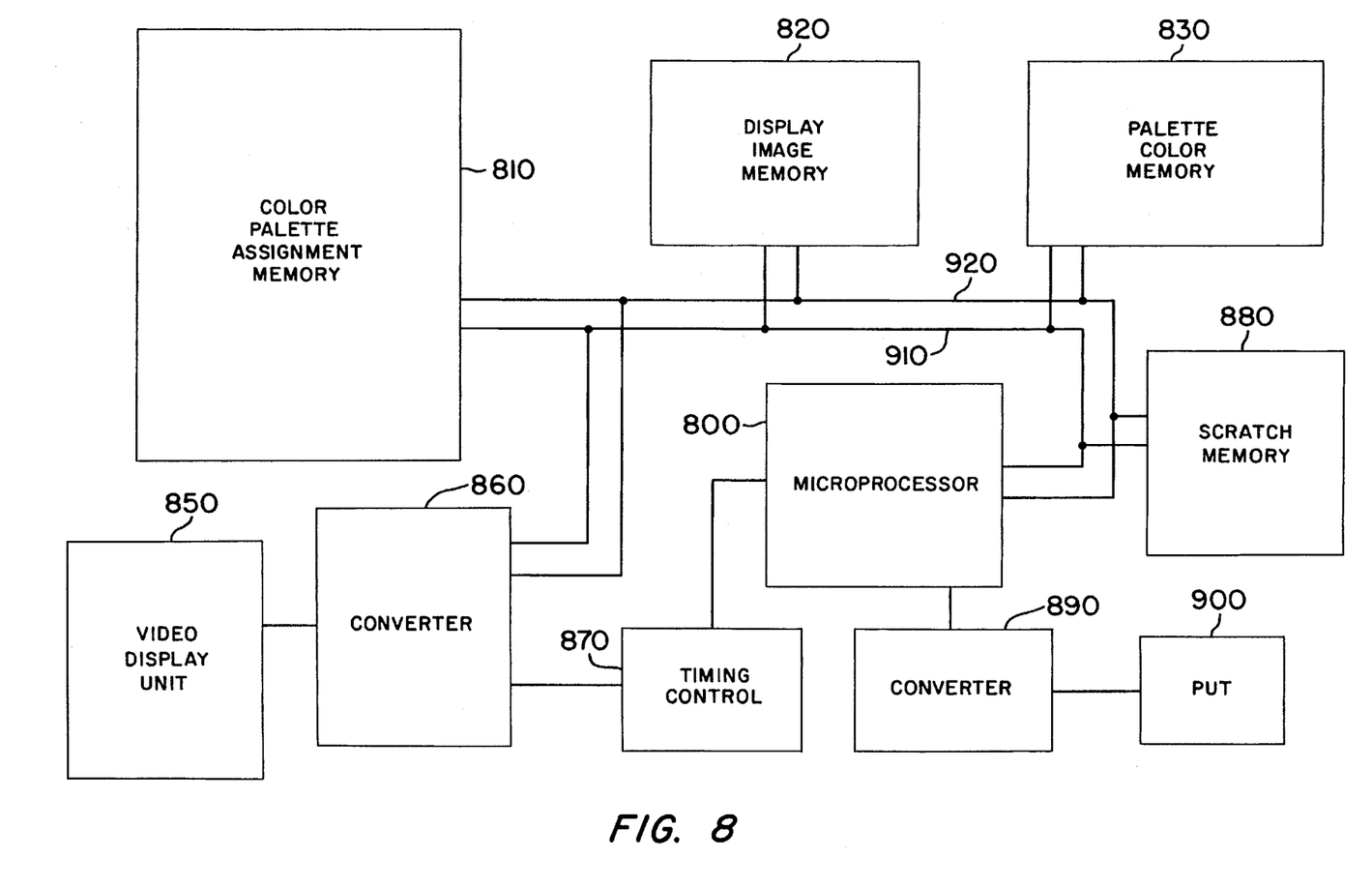
FIG. 8 is a block diagram of a system in accordance with the invention for implementing movement of a character across a video screen.

Referring now to FIG. 8, it presents a block diagram of a system for implementing the the smooth scrolling as described in flowcharts of FIGS. 4–7. Microprocessor (micro) 800 contains a sequence of instructions for implementing smooth scrolling and provides timing and control of address bus 910 and data bus 920. The address and data buses provides for transfer of data between micro 800 and memory elements 810, 820, 830 and 880. Display image memory 820 contains a N by M bit representation of an image to be displayed. Each bit corresponds to a pixel location at the display unit. If a given bit (N, M) is set to a one, the pixel will be displayed, if set to a zero, the pixel will not be displayed. Color palette assignment memory 810 assigns each pixel (N, M) to one of a fixed number of color palettes. Palette color memory 830 contains a digital value for the blue component, the red component and the green component assigned to each color palette. By changing a digital value in the palette color memory 830 for a given palette color, all pixels assigned to that color palette will be changed. Scratch memory (880) is provided for loop counters and other such variables.

Applying the blocks in FIG. 8 to a scrolling foreground character, the character is stored in bit form as ones in display memory 820. The color palette assignment memory 810 initially assigns a given palette to all bits corresponding to the foreground character. All other bits are background and are assigned a different palette. Processing is performed by the micro 800 to locate all the leading edge pixels, and the palette assignment memory 810 is changed so that all leading edge pixels are assigned to a first unused palette. Additionally, processing is performed by the micro to locate all the trailing edge pixels, and, the palette assignment memory 810 is changed so that all trailing edge pixels are assigned to a second unused palette. Fractional scan lines are generated by changing the first and second unused color palettes in palette color memory 830 at a rate determined by the micro 830.

Converter 860 is provided for converting the digital representations to a video signal. Convertor 860 is connected to the color palette assignment memory 810 , the display image memory 820 and palette color memory 830.

A timer controller 870 is connected between micro 800 and converter 860 to provide timing control. The timing control sets the V-blank time interval and provides synchronization to the micro as to when the convertor is accessing the data bus. The video signal is provided to a video display unit 850.

An operator-controlled potentiometer 900 is provided to adjust the scrolling rate of the foreground character. The resistance of the potentiometer is converted by a resistance to digital converter 890 and supplied to micro 800.

As noted at the outset, the invention is implementable on a general purpose computer, such as a personal computer (PC). The following is illustrative of a partial program for such implementation, for fractional scan lines up to sixty-three and for color video display, responsively to rate input, with S values provided as data in the program. REM entries provide various explanations.

```
100 REM This subroutine adjusts the palette so that the leading
110 REM and trailing edge colors change to an appropriate value
120 REM based on the fractional scan line value.
130 REM
140 REM S contains amount of fractional scan line to simulate;
150 REM varies from 0 to 63.
160 REM
170 REM R, G, B contain the red, green and blue component values
180 REM for the background color. Possible values are 0 and 63
190 REM only. A 0 indicates that component is not used (0%
195 REM saturation) while a 63 indicates that component is used
200 REM (100% saturation).
210 REM
220 REM EXAMPLES
230 REM COLOR               R            G            B
240 REM BLACK               0            0            0
250 REM RED                 63           0            0
260 REM GREEN               0            63           0
270 REM YELLOW              63           63           0
280 REM WHITE               63           63           63
290 REM
300 REM R1, G1, B1 are arrays of four entries each. Each entry
310 REM corresponds to one of four possible foreground colors.
320 REM Possible values are 0 and 63 only and have the same
330 REM meaning as the R, G and B variables except that they
335 REM correspond to the foreground colors.
340 REM
350 REM -- DIMENSION ARRAYS --
360 DIM R1(4)
370 DIM G1(4)
380 DIM B1(4)
390 DIM L(64)
400 DIM T(64)
410 REM -- READ VALUES INTO LEADING EDGE ARRAY --
420 FOR X = 1 TO 64
430 READ Y
440 LET L(X) = Y
450 NEXT X
460 REM -- READ VALUES INTO TRAILING EDGE ARRAY --
470 FOR X = 1 TO 64
480 READ Y
490 LET T(X) = Y
```

```
500 NEXT X
510 REM -- COMPUTE SATURATION FOR DARK FOREGROUND
515 REM -- ON BRIGHT BACKGROUND --
520 X = L(64 - S)
530 Y1 = 63 - T(X + 1)
540 Z1 = 63 - X
550 REM -- COMPUTE SATURATION FOR BRIGHT BACKGROUND
555 REM -- ON DARK BACKGROUND --
560 X = L(S + 1)
570 Y2 = T(X + 1)
580 Z2 = X
590 FOR X = 1 TO 4
600 REM -- COMPUTE SATURATION FOR EACH OF RED, GREEN,
605 REM -- AND BLUE COMPONENTS --
610 REM -- COMPUTE SATURATION FOR BLUE COMPONENT --
620 LET Y = Y1
630 LET Z = Z1
640 IF B > B1(X) THEN GO TO 670
650 LET Y = Y2
660 LET Z = Z2
670 LET B2 = B - ((Y AND B) - (Z AND B1(X))
680 LET B3 = B - ((Z AND B) - (Z AND B1(X))
690 REM -- COMPUTE SATURATION FOR GREEN COMPONENT --
700 LET Y = Y1
710 LET Z = Z1
720 IF B > B(X) THEN GO TO 750
730 LET Y = Y2
740 LET Z = Z2
750 LET G2 = G - ((Y AND G) - (Z AND G1(X))
760 LET G3 = G - ((Z AND G) - (Z AND G1(X))
770 REM -- COMPUTE SATURATION FOR GREEN COMPONENT --
780 LET Y = Y1
790 LET Z = Z1
800 IF B > B(X) THEN GO TO 830
810 LET Y = Y2
820 LET Z = Z2
830 LET R2 = R - ((Y AND R) - (Z AND R1(X))
840 LET R3 = R - ((Z AND R) - (Z AND R1(X))
850 REM CHANGE THE PALETTE OF LEADING
855 REM AND TRAILING EDGE COLORS
860 REM USE R2, G2, B2 FOR TRAILING EDGE;
860 REM USE R3, G3, B3 FOR LEADING EDGE
880 NEXT X
890 RETURN
1000 REM PERCENT OF SATURATION TABLE FOR LEADING EDGE ARRAY L
1010 DATA 00, 08, 11, 14, 16, 18, 19, 21, 22, 24, 25, 26, 27, 28, 29, 30, 32, 32
1020 DATA 33, 34, 35, 36, 37, 38, 39, 39, 40, 41, 42, 42, 43, 44, 45, 45
1030 DATA 46, 47, 47, 48, 49, 49, 50, 50, 51, 52, 52, 53, 53, 54, 55, 55
1040 DATA 56, 56, 57, 57, 58, 58, 59, 59, 60, 60, 61, 62, 62, 63
1050 REM PERCENT OF SATURATION TABLE FOR TRAILING EDGE ARRAY T
1060 DATA 63, 63, 63, 63, 63, 63, 62, 62, 62, 62, 62, 62, 62, 62, 62, 62, 62
1070 DATA 61, 61, 61, 61, 61, 61, 61, 60, 60, 60, 59, 58, 58, 57, 56, 56
1080 DATA 55, 55, 54, 54, 54, 53, 53, 52, 52, 51, 50, 49, 48, 48, 47
1090 DATA 45, 44, 43, 42, 40, 38, 36, 33, 31, 30, 28, 27, 25, 22, 10, 00
```

As will be understood from the foregoing and by way of introduction to the following claims, the invention provides a method for scrolling, at a desired rate and in a given direction, a graphic character on a display having a predetermined number of actual scan lines and a vertical blanking interval occurring between successive display of all the actual horizontal scan lines of the display, the method involving the use of fractional scan lines created to exist between successive of the vertical blanking intervals, the method including the steps of: displaying the character as a foreground character of a first color on the display; displaying a background for the character of a second color on the display; identifying leading edges of the character, the leading edges being identified as marginal portions of the background that are adjacently abutted, in a direction directly opposite to the given direction of movement of the character, by the character; identifying trailing edges of the character, the trailing edges being identified as the marginal portions of the character that are adjacently abutted, in the direction directly opposite to the given direction of movement of the character, by the background; identifying a preselected number of the fractional scan lines as a function of the desired rate of character scrolling and the vertical blanking interval; providing a plurality of preselected saturation constants correspondingly with the preselected number of fractional scan lines; selecting a given number of the preselected number of fractional scan lines for the character scrolling; and using the saturation constants selectively in accordance with the selected given number of the fractional scan lines to change the presentation of the leading edges and the trailing edges and thereby effecting the character scrolling.

Apparatus of the invention in its color aspect involves a system for scrolling, at a desired rate and in a given direction, a graphic character on a display having a predetermined number of actual scan lines and a vertical blanking interval occurring between successive display of all the actual horizontal scan lines of the display, the system involving fractional scan lines created to exist between successive of the vertical blanking intervals, the system comprising: circuitry for displaying the character as a foreground character of a first color on the display; circuitry for displaying a background for the character of a second color on the display; circuitry for identifying leading edges of the character, the leading edges being identified as marginal portions of the background that are adjacently abutted, in a direction directly opposite to the given direction of movement of the character, by the character; circuitry for identifying trailing edges of the character, the trailing edges being identified as the marginal portions of the character that are adjacently abutted, in the direction directly opposite to the given direction of movement of the character, by the background; circuitry for identifying a preselected number of the fractional scan lines as a function of the desired rate of character scrolling and the vertical blanking interval; circuitry for providing a plurality of preselected color saturation constants correspondingly with the preselected number of fractional scan lines; circuitry for selecting a given number of the preselected number of fractional scan lines for the character scrolling; and circuitry for using the saturation constants selectively in accordance with the selected given number of the fractional scan lines to change colors of the leading edges and the trailing edges and thereby effecting the character scrolling.

Various alternatives to the foregoing system and practice can be effected to attain the smooth scrolling provided by the invention, such as in determining the leading and trail edge pixels. In FIG. 7, steps 700–710, the range for S and the number of values in the data table can be increased accordingly beyond sixty-four. Step 710 can be eliminated and equivalent data values preset in the program or the data values can be implemented by a mathematical formula as opposed to being table based. In FIG. 8, the color palette assignment memory 810 can be replaced by a display image memory 820 expanded to have four bit planes whereby various combinations of the bit planes indicate what value to use from the palette color memory 830. In FIG. 8, the function of the converter 890 can be incorporated by the microprocessor 800 by executing a software timing loop to time how long it takes a voltage to drain across the potentiometer 900.

In FIG. 4, the step of identifying the leading edge and trailing edge pixels 430 is repeated periodically for convenience of discussion and explanation. Alternatively, all possible characters can be read into RAM upon initialization of the program at which time the steps to compute the leading and trailing edges are executed. The leading and trailing edges can then be stored as a bit pattern similar to those for the actual character. Then when the character is subsequently drawn, it is drawn in three stages: first, the body of the character, then the leading edge and finally the trailing edge are drawn using the stored bit pattern.

With respect to the range of sixty-four possible values used for each of the red, green and blue components, a zero indicates zero percent saturation and sixty-three indicates a one-hundred percent saturation of that component. This particular range is employed when use is made of the current standard VGA card. As will be appreciated, the range can change in accordance with the capacities of future standard video cards.

The foregoing practice is dependent on the RGB method wherein the red, blue and green components are combined to make a RBG video signal. Evidently, the practice would be modified if another method of producing the video signal were used.

The foregoing and other changes may be introduced in the foregoing practice and system without departing from the invention. Accordingly, it is to be understood that the particularly described and depicted preferred embodiments and practices are intended in an illustrative and not in a limiting sense. The true spirit and scope of the invention is set forth in the following claims.

What is claimed is:

1. A method for scrolling a graphic character on a display having a predetermined number of actual vertically spaced scan lines N and a predetermined number of horizontal display pixel locations M in each of the N actual scan lines, wherein the character is displayed by a first color on said display and a background for said character is displayed by a second color on said display and wherein said method involves the use of fractional scan lines created to exist between successive of said actual scan lines, including the steps of:

(a) identifying pixels of said character and said background respectively in accordance with said first and second color contents thereof, storing an array (N times M) of signals indicative of the color type of each character and background pixel and assigning respective first and second color palettes thereto;

(b) defining leading edge and trailing edge pixels of said character by examining said array in a column sequence of N to 1 for each M row location of the array and identifying as a leading edge pixel each examined location where the color of the examined location is of said first color and the previously examined location is of said second color and identifying as a trailing edge pixel each examined location where the color of the examined location is of said second color and the previously examined location is of said first color;

(c) assigning respective third and fourth color palettes to said leading edge and trailing edge pixels;

(d) identifying a preselected number of said fractional scan lines as a function of a desired rate of character scrolling and a vertical blanking interval, (e) providing a plurality of preselected color saturation constants correspondingly with said preselected number of fractional scan lines;

(f) selecting a given number of said preselected number of fractional scan lines for said character scrolling; and (g) using said saturation constants selectively in accordance with said selected given number of said fractional scan lines to change colors of said third color palette and said fourth color palette thereby changing the color of the leading edge pixels of the character and the color of the trailing edge pixels of the character and thereby effecting said character scrolling.

2. A system for scrolling a graphic character on a display having a predetermined number of actual vertically spaced scan lines N and a predetermined number of horizontal display pixel locations M in each of the N actual scan lines, wherein the character is displayed by a first color on said display and a background for said character is displayed by a second color on said display and wherein fractional scan lines are created to exist between successive of said actual scan lines, said system including:

(a) first means for identifying pixels of said character and said background respectively in accordance with said first and second color contents thereof, storing an array (N times M) of signals indicative of the color of each character and background pixel and assigning respective first and second color palettes thereto;

(b) second means for defining leading edge and trailing edge pixels of said character by examining said array in a column sequence of N to 1 for each M row location of the array and identifying as a leading edge pixel each examined location where the color of the examined location is of said first color and the previously examined location is of said second color and identifying as a trailing edge pixel each examined location where the color of the examined location is of said second color and the previously examined location is of said first color;

(c) third means for assigning respective third and fourth color palettes to said leading edge and trailing edge pixels;

(d) fourth means for providing a plurality of preselected color saturation constants correspondingly with said preselected number of fractional scan lines;

(f) fifth means for selecting a given number of said preselected number of fractional scan lines for said character scrolling; and (g) sixth means using said saturation constants selectively in accordance with said selected given number of said fractional scan lines to change colors of said third color palette and said fourth color palette thereby changing the color of the leading edge pixels of the character and the color of the trailing edge pixels of the character and thereby effecting said character scrolling.

3. A method for scrolling a graphic character on a display having a predetermined number of actual vertically spaced scan lines N and a predetermined number of horizontal display pixel locations M in each of the N actual scan lines, wherein the character is displayed in a first shading on said display and a background for said character is displayed in a second shading diverse from said first shading, including the steps of:

(a) identifying pixels of said character and said background respectively in accordance with said first and second shadings thereof, storing an array (N times M) of signals indicative of the shading of each character and background pixel and assigning respective first and second shading palettes thereto;

(b) defining leading edge and trailing edge pixels of said character by examining said array in a column sequence of N to 1 for each M row location of the array and identifying as a leading edge pixel each examined location where the shading of the examined locating is of said first shading and the previously examined location is of said second shading and identifying as a trailing edge pixel each examined location where the shading of the examined location is of said second shading and the previously examined location is of said first shading;

(c) identifying a preselected number of fractional scan lines between said actual scan lines as a function of a desired rate of character scrolling and a vertical blanking interval, (d) providing a plurality of preselected shading saturation constants correspondingly with said preselected number of fractional scan lines;

(e) selecting a given number of said preselected number of fractional scan lines for said character scrolling; and (h) using said shading saturation constants selectively in accordance with said selected given number of said fractional scan lines to change the shading of leading and trailing edge pixels and thereby effecting said character scrolling.

4. A system for scrolling a graphic character on a display having a predetermined number of actual vertically spaced scan lines N and a predetermined number of horizontal display pixel locations M in each of the N actual scan lines, wherein the character is displayed by a first shading on said display and a background for said character is displayed by a second shading on said display and wherein fractional scan lines are created to exist between successive of said actual scan lines, said system including:

(a) first means for identifying pixels of said character and said background respectively in accordance with said first and second shadings thereof, storing an array (N times M) of signals indicative of the shading type of each character and background pixel and assigning respective first and second shading palettes thereto;

(b) second means for defining leading edge and trailing edge pixels of said character as currently displayed by examining said array in a column sequence of N to 1 for each M row location of the array and identifying as a leading edge pixel each examined location where the shading of the examined location is of said first shading and the previously examined location is of said second shading and identifying as a trailing edge pixel each examined location where the shading of the examined location is of said second shading and the previously examined location is of said first shading;

(c) third means for identifying a preselected number of fractional scan lines between said actual scan lines as a function of a desired rate of character scrolling and a vertical blanking interval;

(d) fourth means for providing a plurality of preselected shading saturation constants correspondingly with said preselected number of fractional scan lines;

(e) fifth means for selecting a given number of said preselected number of fractional scan lines for said character scrolling; and (h) sixth means for using said shading saturation constants selectively in accordance with said selected given number of said fractional scan lines to change the shading of leading and trailing edge pixels and thereby effecting said character scrolling.

* * * * *